Dec. 6, 1927.
L. CASKIN
COOKING UTENSIL
Filed March 13, 1926
1,651,442
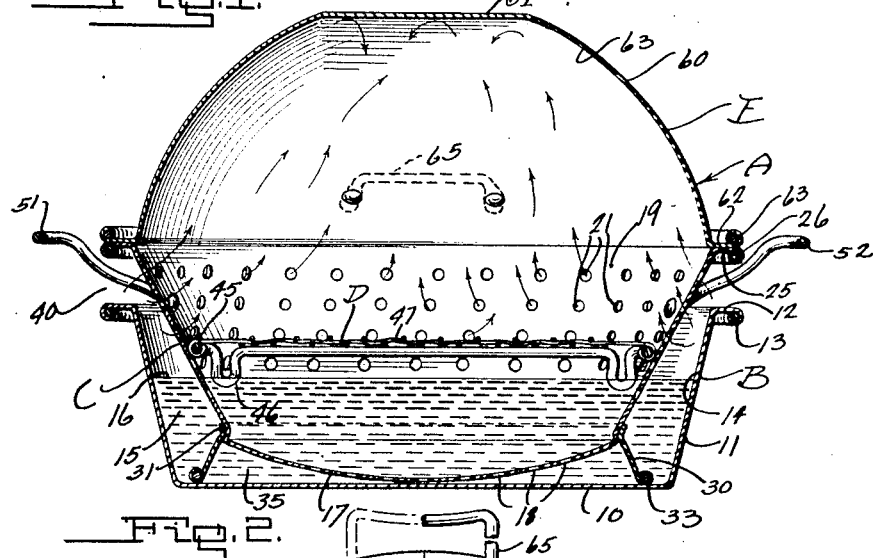
Inventor
Langdon Caskin
By Lamaster and Allwine
Attorneys Patented Dec. 6, 1927.

1,651,442

UNITED STATES PATENT OFFICE.

LANGDON CASKIN, OF HAVERFORD, PENNSYLVANIA.

COOKING UTENSIL.

Application filed March 13, 1926. Serial No. 94,509.

This invention relates to improvements in cooking utensils.

The primary object of this invention is the provision of an improved steam cooking utensil, embodying a novel arrangement of receptacles wherein meats, vegetables, fruits, and the like may be efficiently and thoroughly cooked.

A further object of this invention is the provision of an improved cooking utensil embodying a novel arrangement of parts by which to steam cook various articles of food; the invention including means to condense the steam therein over the article being cooked, in such manner as to efficiently provide for the thorough cooking of the article of food; the improved device being so arranged as to operate without any visible exterior means of determining that the steam is being generated or the water boiling in the cooking utensil.

Other objects and advantages of this invention will be apparent during the course of the following detailed description.

In the accompanying drawing, forming a part of this specification, and wherein similar reference characters designate corresponding parts throughout the several views, Figure 1 is a cross sectional view taken through the improved cooking utensil, showing the same filled with water or cooking liquid to the preferred maximum level in relation to the support for the article of food therein.

Figure 2 is a fragmentary view, partly in plan, and partly in section, showing improved details of the cooking utensil.

In the drawing, wherein for the purpose of illustration is shown only a preferred embodiment of the invention, the letter A may generally designate the improved cooking utensil, which may comprise a water receiving vessel or receptacle portion B wherein is supported a perforate food receiving vessel or receptacle C, having a tray D detachably supported therein for supporting the article of food above the water line of the receptacle B. A dome-shaped cover E is provided for the receptacle or vessel C to cooperate in the cooking of the article, thoroughly, and to augment the stem condensation and to regulate the path of steam travel about the article of food.

The water receptacle B is preferably of the open top type, including an imperforate bottom 10, and the upstanding preferably annular side walls 11, which may diverge from the bottom wall 10 upwardly. At its upper end the wall 11 is preferably provided with a horizontal outwardly extending annular flange 12, which may be rolled under as at 13, at its free edge. This construction provides a compartment 14 wherein water 15 is disposed to the level 16 slightly deeper than one-half the total depth of the compartment 14 from the top flange 12.

The article receiving vessel or receptacle C is of novel formation, including a concavo-convex perforate bottom 17 having perforations 18 therein of desired size; the bottom 17 being bowed downwardly with its convex side facing downwardly. The vessel C furthermore includes the annular side wall 19, which is perforate, having annular series of openings 21 therein. The wall 19 is preferably integral with the bottom 17, and diverges from the bottom 17 upwardly to the upper edge thereof. The vessel C is entirely open at the top thereof, and over this open top the cover E detachably cooperates. At its upper edge the wall 19 is outwardly flanged, providing an annular outwardly extending horizontally disposed flange 25, having a bead or roll 26 rolled underneath the same. The flange 25 at its external diameter is of exactly the same diameter as the flange 12 at its external diameter.

An annular supporting base 30 is preferably formed upon the receptacle or vessel C having a connection 31 at the juncture of the bottom 17 with the wall 19; this base 30 being imperforate, and extending downwardly in a divergent relation from its connection with the vessel C. At its lower edge the annular base 30 is outwardly rolled at 33, providing a supporting edge, the lower surface of which is disposed in a horizontal plane and adapted to rest upon the inside surface of the bottom 10 of the receptacle B, as is illustrated in the drawing. The lower rest edge of the roll 33 is disposed in a plane below the peak of the bottom surface of the bottom wall 17, so that when the base 30 is resting upon a surface, such as the bottom 10 of the receptacle B, the perforate bottom 17 will be disposed in an upwardly supported relation free of contact above the bottom 10 of the receptacle or vessel B.

As disposed within the vessel B, the article receiving receptacle or vessel C has the base 30 thereof resting on the bottom wall 10 of the vessel B, and as the base 30 is of a diameter, at its rest roll 33 slightly less than the diameter of the wall 10, the roll edge 33 of the base 30 will rest on the bottom 10 at the juncture of the wall 11 and the bottom 10 of the receptacle B. In this relation of parts a space 35 is disposed between the bottoms 10 and 17 of the vessels B and C, wherein water is disposed. The vessel C from its support edge of the base 30 to the top edge thereof is higher than the compartment 14 in the vessel B, and so as to position the top flange 25 of the vessel C in horizontally spaced relation immediately above and parallel with the flange 12 of the vessel B. This provides an annular space 40 between the flanges 12 and 25, thru which cold air is drawn into the vessel C during the cooling operation, as will be subsequently described. The wall 19 of the vessel C is inclined to a greater degree than the wall 11 of the vessel B; said walls converging from the bottom of the vessel upwardly to the flanges at their upper ends, but always lying in spaced relation, to permit the air to pass thru the space 40 downwardly into the compartment 14, to the extent permitted during the steaming operation, and then pass transversely thru the perforations 21 in the wall 19 of the vessel C, to the interior of the vessel C.

The supporting tray or grate D is of conventional construction, and may comprise an annular supporting ring 45, which is crimped intermediate its ends to provide supporting legs 46 adapted to rest at the inside surface of the wall 19 of the vessel C to support the tray D. The supporting wire or member 45 has connected therewith a reticulate screen 47 of any approved mesh.

The diameter of the tray D bears such a relation to the internal diameter of the compartment of the vessel C, that when the same is lowered into the compartment of the vessel C it will be held suspended above the bottom 17 of the vessel C, with the screen portion 47 above the maximum water level line 16, so that articles of food to be cooked may be placed upon the screen 47 above the water. The tray D is placed in a plane below the top flange 12 of the receptacle B, as is illustrated in Figure 1 of the drawing.

The vessel C is preferably provided with rigid U-shaped handles 51 and 52 at opposite sides thereof, rigidly connected upon the exterior surface of the wall 19, and extending in any approved formation outwardly thru the opening 40 between the vessels B and C at the flange portions 12 and 25 thereof; with said handles 51 and 52 projecting to a desired extent whereby an operator may grasp the same with ease without the necessity of inserting a hand into the opening 40, and to lift the receptacle C out of the water receptacle.

The cover E is preferably an imperforate dome, of general concavo-convex formation, the same including an imperforate dome body 60, which may be flat at the top 61 thereof and converging from the portion 61 downwardly, and at its lower edge having an outwardly extending supporting flange 62 horizontally disposed and of about the same width as the flange 25, having laterally a rolled portion 63 of the same diameter as the roll 26. The dome cover E provides a compartment 63 upwardly therein of about the same depth as the compartment of the vessel C. The cover E is placed directly upon the top flange 25 of the vessel C, with the compartment 63 facing downwardly. Diametrically opposed handles 65 of U-shaped formation are preferably rigidly formed on the dome body 60, in a position to permit a person to grasp the same to remove the cover E without removal of either of the vessels B or C.

Referring to the operation of the device the parts are assembled as above described, and water filled in the receptacles B and C to a level below the tray D. It is to be noted that the space 35 laterally enclosed by the imperforate upwardly converging base 30 is disposed over that portion of the wall 10 which receives the flame or heating medium, so that the body of water within the space 35 is at the location where the maximum heat will operate upon the same to cause the water to boil and generate steam. The steam will pass through the perforations 18 of the bottom 17 and percolate upwardly through the body of water and pass about the article of food supported on the tray D for cooking the same. The fact that the base 30 is imperforate and that it encloses practically the entire bottom surface of the wall 10 insures that no steam will pass upwardly between the walls 11 and 19 of the receptacles B and C. The thus generated steam passes upwardly into the compartment above the tray D, and due to the thermosiphonic action cold air will be drawn thru the annular passageway 40 between the flanges 12 and 25, and pass thru the openings 21 into the upper portion of the compartment of the cover E, to condense the steam therein, which precipitates downwardly over the article of food being cooked, and the water returned into the receptacle C. An exterior observation of the cooking action of the improved cooking utensil A will not disclose that the water is boiling therein, while the parts are assembled, and the fact that steam is generated in the cooking compartment below the cover E is not visible to observers exteriorly of the cooking utensil. This is particularly desirable, and especially so when considering the thoroughness with which the articles of food may be cooked, due to the efficient circulatory action of the steam on the article of food being cooked. The device is particularly well adapted for the cooking of huge roasts, thoroughly, and without exterior destruction of the parts of the roast, as is commonly the case when otherwise cooking huge articles of food. In fact, with the cooking utensil of this invention I have steamed a 43-lb. roast, thoroughly and without frazzling the same, and have thus enhanced materially the savory deliciousness of the same.

Various changes in the shape, size, and arrangement of parts may be made to the form of invention herein shown and described, without departing from the spirit of the same and the scope of the claims.

I claim:

1. In a cooking utensil the combination of a water receptacle, a perforate article receiving receptacle adapted to fit into the water receptacle, said perforate receptacle including a perforate bottom, and an imperforate annular supporting base for supporting the perforate receptacle on the bottom of the water receptacle with the perforate bottom spaced above the lower portion of the water receptacle and the annular base enclosing said space to direct steam into the perforate receptacle thru said perforate base, said perforate receptacle being laterally spaced within the water receptacle and at its upper portion being spaced from the water receptacle and extending exteriorly above the top of the water receptacle, said perforate receptacle having a detachable dome-shaped cover of imperforate formation resting on the perforate receptacle in unobstructing relation with the space between the water receptacle and top of the perforate receptacle.

2. In a cooking utensil an open top water receptacle, a perforate article receiving receptacle, means to support the perforate article receiving receptacle in the water receptacle in laterally spaced relation therein and upwardly extending relation above the top of the water receptacle, said upwardly extending portion of the perforate receptacle being perforate to permit lateral direction of air into the perforate receptacle, and an imperforate dome-shaped top for enclosing the top of the perforate receptacle only.

3. In a cooking utensil the combination of a water receptacle including a bottom wall and side walls and providing a compartment therein open at the top of the receptacle, a perforate vessel adapted to seat within the water receptacle including a perforate bottom and a perforate side wall, and an imperforate supporting base connected to the perforate vessel and extending below the perforate bottom of said perforate vessel at its lower edge providing a rest surface adapted to seat about the entire lower edge thereof on the interior of the bottom of the water receptacle to support the perforate vessel in the water receptacle with the perforate bottom thereof spaced above the bottom of the water receptacle, said perforate vessel having the side wall thereof less in dimension between diametrically opposed points than the water receptacle whereby to space the walls of the water receptacle and the perforate vessel, said perforate vessel at its upper portion extending above the top of the water vessel and providing an annular open space between the tops of the water vessel and perforate vessel.

4. In a cooking utensil the combination of a water receptacle including a bottom wall and side walls and providing a compartment therein open at the top of the receptacle, a perforate vessel adapted to seat within the water receptacle including a perforate bottom and a perforate side wall, and an imperforate supporting base connected to the perforate vessel and extending below the perforate bottom of said perforate vessel at its lower edge providing a rest surface adapted to seat on the interior of the bottom of the water receptacle to support the perforate vessel in the water receptacle with the perforate bottom thereof spaced above the bottom of the water receptacle, said perforate vessel having the side wall thereof less in dimension between diametrically opposed points than the water receptacle whereby to space the walls of the water receptacle and the perforate vessel, said perforate vessel at its upper portion extending above the top of the water vessel and providing a lateral opening annular space between the planes of the tops of the water vessel and perforate vessel, said perforate vessel having some perforations in the side wall thereof immediately facing said annular space.

5. In a cooking utensil the combination of a water receptacle including a bottom wall and side walls and providing a compartment therein open at the top of the receptacle, a perforate vessel adapted to seat within the water receptacle including a perforate bottom and a perforate side wall, and an imperforate supporting base connected to the perforate vessel and extending below the perforate bottom of said perforate vessel at its lower edge providing a rest surface adapted to seat on the interior of the bottom of the water receptacle to support the perforate vessel in the water receptacle with the perforate bottom thereof spaced above the bottom of the water receptacle, said perforate vessel having the side wall thereof less in dimension between diametrically opposed points than the water receptacle whereby to space the walls of the water receptacle and the perforate vessel, said perforate vessel at its upper portion extending above the top of the water vessel and providing an annular open space between the tops of the water vessel and perforate vessel, said perforate vessel having some perforations in the side wall thereof facing said annular space, and a dome-shaped imperforate cover for the perforate vessel only providing a compartment extending upwardly therein which faces downwardly into the perforate vessel.

6. In a cooking utensil the combination of a water receptacle including a bottom wall and a side wall upwardly diverging from the bottom wall, a perforate vessel including a perforate bottom wall and a perforate side wall diverging upwardly from its bottom wall, an imperforate annular supporting base connected at its upper end to the perforate vessel adjacent the juncture of the bottom and side walls of the perforate vessel and extending downwardly therefrom in a divergent relation to provide a lower supporting edge disposed in a plane below the perforate bottom of the vessel for resting on the interior surface of the bottom of the water receptacle whereby to support the bottoms of the water receptacle and perforate vessel in a spaced relation, the space being laterally enclosed by said imperforate base, said water receptacle and perforate vessel being unequal in width to provide an annular space between the walls of said water receptacle and perforate vessel when the latter is assembled within the former, said side walls of the water receptacle and perforate vessel having laterally extending spaced flanges thereon to provide an annular passageway leading into the space between the side walls of said receptacle and vessel, said perforate vessel side wall having perforations therein facing said annular space.

7. In a cooking utensil the combination of a water receptacle including a bottom wall and a side wall upwardly diverging from the bottom wall, a perforate vessel including a perforate bottom wall and a perforate side wall diverging upwardly from its bottom wall, an imperforate supporting base connected at its upper end to the perforate vessel and extending downwardly therefrom in a diverging relation to provide a lower supporting edge disposed in a plane below the perforate bottom of the vessel for resting on the interior surface of the bottom of the water receptacle whereby to support the bottoms of the water receptacle and perforate vessel in a spaced relation, the space being laterally enclosed by said imperforate base, said water receptacle and perforate vessel being unequal in width to provide an annular space between the walls of said water receptacle and perforate vessel when the latter is assembled within the former, said side walls of the water receptacle and perforate vessel having laterally extending spaced flanges thereon to provide an annular passageway leading into the space between the side walls of said receptacle and vessel, said perforate vessel side wall having perforations thereon facing said annular space, and an imperforate detachable cover of dome-shaped formation on the perforate vessel having a compartment facing downwardly towards the perforate vessel.

8. In a cooking utensil the combination of an open topped water receiving receptacle having a compartment therein open at the top thereof, a perforate vessel adapted to be disposed within the compartment of the water receptacle, means to seat the perforate vessel in the compartment of the water receptacle in laterally spaced relation therewith to permit steam to pass from the water vessel into the perforate vessel, said perforate vessel at the upper end thereof extending outwardly of the top of the water vessel and having perforations above the top of the water vessel.

9. In a cooking utensil the combination of an open topped water receiving receptacle having a compartment therein open at the top thereof, a perforate vessel adapted to be disposed within the compartment of the water receptacle, means to seat the perforate vessel in the compartment of the water receptacle in laterally spaced relation therewith to permit steam to pass from the water vessel into the perforate vessel, said perforate vessel at the upper end thereof extending outwardly of the top of the water vessel and having perforations above the top of the water vessel, said water vessel and perforate vessel at the top thereof having outwardly extending substantially parallel flanges in spaced relation to provide an annular entrance opening to the space in the compartment of the water vessel between the water vessel and the perforate vessel.

10. In a cooking utensil the combination of an open topped water receiving receptacle having a compartment therein open at the top thereof, a perforate vessel adapted to be disposed within the compartment of the water receptacle, means to seat the perforate vessel in the compartment of the water receptacle in laterally spaced relation therewith to permit steam to pass from the water vessel into the perforate vessel, said perforate vessel at the upper end thereof extending outwardly of the top of the water vessel and having perforations above the top of the water vessel, said water vessel and perforate vessel at the top thereof having outwardly extending substantially parallel flanges in spaced relation to provide an annular entrance opening to the space in the compartment of the water vessel between the water vessel and the perforate vessel, and a detachable imperforate dome-shaped cover for the perforate vessel having a compartment therein facing downwardly into the perforate vessel.

11. In a cooking utensil the combination of a water receiving vessel including a bottom and side walls and having a compartment open at the top of the water vessel, a perforate vessel including a perforate bottom and perforate side walls, an imperforate annular base adapted to rest on the bottom of the water vessel to support the perforate vessel within the compartment of the water vessel with the perforate bottom thereof spaced above the bottoms of the water vessel and with an upper perforate portion of the perforate vessel extending above the top of the water vessel, said perforate vessel being less in width than the width of the compartment of the water vessel to lie in spaced relation therewith throughout the depth of said compartment and at the open top of said compartment, and a food supporting tray in the perforate vessel above the perforate bottom thereof.

12. In a cooking utensil a water vessel, a perforate vessel open at the top thereof, an imperforate dome cover for said perforate vessel, means to support the perforate vessel in spaced relation in the water vessel with an upper perforate portion thereof extending above the top of the water vessel and in spaced relation therewith, and a tray supported in the perforate vessel above the perforate bottom thereof.

13. In a cooking utensil a water receptacle having a compartment therein open at the top thereof, said water receptacle at its top having an annular outwardly extending flange thereabout, a perforated vessel supported in the compartment of the water receptacle, said perforated vessel including a perforated bottom and perforated side walls, an imperforate annular supporting leg on the perforate vessel resting on the bottom of the water vessel for supporting the perforated bottom of the perforated vessel in spaced relation above the bottom of the water vessel so that steam from the bottom of the water vessel may enter through the perforate bottom and be guided and restricted by said annular imperforate leg to a flow into the perforated vessel, said perforated vessel at its side walls being spaced from the side walls of the water vessel, and the perforated vessel at its top extending above the top of the water vessel and said perforated vessel at its top having an annular outwardly extending flange spaced above the flange at the top of the water vessel, said perforated vessel having perforations directly facing the space between said flanges of the water vessel and perforated vessel, an imperforated dome cover supported on said perforated vessel providing a compartment upwardly therein facing the compartment of the perforated vessel and of about the same area as the compartment in the perforated vessel, said water vessel and perforated vessel being adapted to receive water to a predetermined level, and a food supporting tray carried within said perforated vessel at an elevation immediately above the predetermined level at which water is maintained in the perforate vessel.

LANGDON CASKIN.